Aug. 18, 1942.  E. E. BROOKS  2,293,531
PLANT BULB PROTECTOR
Filed Feb. 1, 1940
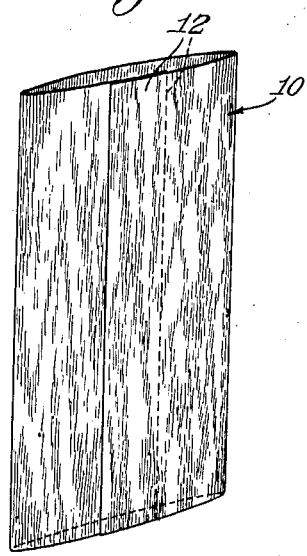
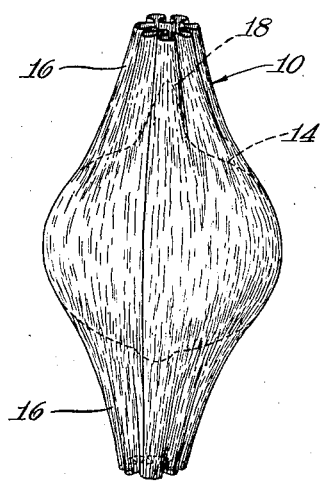
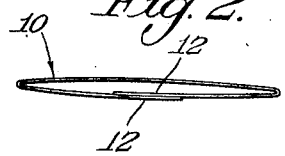
Ernest E. Brooks.
INVENTOR
BY Victor J. Evans & Co.
ATTORNEYS Patented Aug. 18, 1942

2,293,531

UNITED STATES PATENT OFFICE 2,293,531

PLANT BULB PROTECTOR

Ernest E. Brooks, Framingham, Mass., assignor to Dennison Manufacturing Company, Framingham, Mass., a corporation of Massachusetts Application February 1, 1940, Serial No. 316,834

2 Claims. (Cl. 47—37)

My invention relates to improvements in plant protection, particularly protectors for bulbs, such as hyacinths, narcissi, lilies, etc.; and the objects of my invention are, first, to provide a bulb protector which is designed to facilitate application of the protector to bulbs of variable sizes; second, to provide a novel bulb protector impregnated with fungicide, rodent repellent or both; third, to provide a bulb protector in the nature of a crepe paper tube which is creped in such manner as to afford a large degree of compensation for relatively large variation in the sizes of the bulbs, with the tube further creped so as to maintain the tube ends thereof constricted partly about the bulb so as to attach firmly thereto; and, fourth, to provide a bulb protector fashioned to collapse flatly so that the protectors may be assembled into a compact mass to facilitate packaging and transportation.

In the accompanying drawing:

Figure 1 is a perspective view of a protector in accordance with my invention;

Figure 2 is an end view illustrating the manner in which the protector may be flattened; and Figure 3 is a perspective view illustrating the application of the protector to a plant bulb.

In the embodiment selected to illustrate my invention, the tube 10 comprises crepe paper originally in the form of a rectangular sheet folded back upon itself and its overlapping margins 12 secured one to the other by a suitable adhesive. The paper is preferably creped in the ratio of two or two and one-half to one, with the crinkles paralleling the axis of the tube. Figs. 1 and 2 illustrate the normal contour of the protector, at which time the tube is substantially flattened and of uniform width from end to end.

The crepe paper is impregnated with a fungicide as well as a rodent repellent. I have employed hydroxymercurichlorophenol as a fungicide with good results, while for the rodent repellent I have employed one part of methyl salicylate and one part of dibutyl phthalate. The fungicide and rodent repellent are incorporated in the crepe paper after creping thereof.

Fig. 3 illustrates a plant bulb 14 inserted in the tube 10 substantially midway of the tube, at which time the tube ends 16 project beyond the bulb. The bulb expands the tube throughout its central area and the tube ends 16 remain somewhat constricted. The ends 16 may be folded about the tube so as to provide a complete enclosure therefor, but the upper end 16 is preferably so folded as to offer little or any resistance to the sprout 18. Accordingly, the protector is planted with the bulb, and the protector provides a highly water-permeable membrane around the plant bulb, which membrane affords ample protection as a fungicide and rodent repellent means.

The protectors may be folded flat and nested in a compact mass so that a large quantity of protectors may be closely nested for packaging and transportation purposes.

The protector functions to kill germs which attack the bulbs either from the bulb itself or from the earth in contact therewith. Obviously, other germicides may be employed, depending on the nature of the germs which are to be destroyed.

Having thus described certain embodiments of my invention in detail, it is, of course, understood that I do not desire to limit the scope thereof to the exact details set forth except insofar as those details may be defined in the appended claims.

I claim:

1. A plant bulb protector comprising a paper tube having crinkles paralleling the axis of the tube, said tube having a normal diameter smaller than the diameter of the bulb to be inserted therein and said crinkles being of such magnitude and distribution as to render the tube expansible, the length of the tube being materially greater than the diameter of the bulb so that the ends of the tube project considerable distances beyond the bulb positioned inside the tube intermediate its ends, and said tube being expansible in such degree as to closely conform to and substantially embrace the greater surface of the bulb, with the ends of the tube projecting beyond the bulb being self-constricting to relatively small diameters.

2. A plant bulb protector comprising a paper tube having crinkles paralleling the axis of the tube, said tube having a normal diameter smaller than the diameter of the bulb to be inserted therein and said crinkles being of such magnitude and distribution as to render the tube expansible, said tube being provided with a fungicide and a rodent repellent, the length of the tube being greater than the diameter of the bulb so as to extend the ends of the tube considerable distances beyond the bulb therein, said tube being expansible in such degree as to closely conform to the contour of a large surface of the bulb, and the ends of the tube projecting beyond the bulb inherently fluting to substantially closed formations.

ERNEST E. BROOKS.